US011475008B2

(12) United States Patent
Teo et al.

(10) Patent No.: US 11,475,008 B2
(45) Date of Patent: Oct. 18, 2022

(54) SYSTEMS AND METHODS FOR MONITORING USER-DEFINED METRICS

(71) Applicant: Capital One Services, LLC, McLean, VA (US)

(72) Inventors: Koon Heng Ivan Teo, San Francisco, CA (US); Qingyi Sui, Falls Church, VA (US); Mohammad Shami, Foster City, CA (US); Yoonseong Kim, Berkley, CA (US); Fernando San Martin Jorquera, Los Altos, CA (US); Francisco Perez Leon, Richmond, CA (US)

(73) Assignee: Capital One Services, LLC, McLean, VA (US)

( * ) Notice: Subject to any disclaimer, the term of this patent is extended or adjusted under 35 U.S.C. 154(b) by 101 days.

(21) Appl. No.: 16/860,154

(22) Filed: Apr. 28, 2020

(65) Prior Publication Data
US 2021/0334274 A1 Oct. 28, 2021

(51) Int. Cl.
G06F 16/00 (2019.01)
G06F 16/2455 (2019.01)
(Continued)

(52) U.S. Cl.
CPC ........ *G06F 16/2455* (2019.01); *G06F 16/242* (2019.01); *G06F 16/283* (2019.01)

(58) Field of Classification Search
CPC ... G06F 16/2455; G06F 16/242; G06F 16/283
See application file for complete search history.

(56) References Cited

U.S. PATENT DOCUMENTS 6,421,632 B1 * 7/2002 LeCorney ........... H04L 41/5003
714/704
6,789,046 B1 * 9/2004 Murstein ............. H04L 41/0803
702/182

(Continued)

OTHER PUBLICATIONS

Extended European Search Report dated Sep. 23, 2021 in European Application No. 21170731.0 (8 pages).

(Continued)

*Primary Examiner* — Polina G Peach
(74) *Attorney, Agent, or Firm* — Bookoff McAndrews, PLLC

(57) ABSTRACT

Disclosed are systems and methods for monitoring user-defined metrics. A method may include: receiving, from a user device, a metric definition usable to generate queries to obtain data for a metric to be monitored; receiving, from the user device, a monitoring configuration indicative of a manner in which a metric monitoring process associated with the metric definition is to be repeatedly performed; storing the metric definition in a metric definition database; and repeatedly performing the metric monitoring process in accordance with the monitoring configuration. The metric monitoring process may include: retrieving the metric definition from the metric definition database; generating a database query based on the metric definition, the database query including one or more executable database statements defined by the metric definition; executing the database query to obtain query result data, the query result data being data for the metric; and storing the query result data.

20 Claims, 4 Drawing Sheets

(51) Int. Cl.
*G06F 16/242* (2019.01)
*G06F 16/28* (2019.01)
*G06F 16/30* (2019.01)

(56) References Cited

U.S. PATENT DOCUMENTS

| | | | |
|---|---|---|---|
| 7,840,550 B2 | 11/2010 | Collet et al. | |
| 7,953,765 B2 | 5/2011 | Vaught | |
| 9,183,529 B2 | 11/2015 | Gluzman Peregrine et al. | |
| 9,396,287 B1* | 7/2016 | Bhave | G06F 11/3409 |
| 9,712,410 B1* | 7/2017 | Char | H04L 43/08 |
| 10,061,789 B2* | 8/2018 | James | G06F 16/217 |
| 10,970,298 B1* | 4/2021 | Madheswaran | G06F 16/22 |
| 2004/0153329 A1* | 8/2004 | Casati | G06Q 10/06 715/736 |
| 2005/0021306 A1 | 1/2005 | Garcea et al. | |
| 2008/0133489 A1* | 6/2008 | Armstead | G06F 11/3414 |
| 2008/0163164 A1* | 7/2008 | Chowdhary | G06Q 10/06 717/106 |
| 2010/0094828 A1* | 4/2010 | Mehta | G06F 9/5027 707/705 |
| 2015/0234834 A1* | 8/2015 | Haber | G06F 16/2455 707/774 |
| 2016/0378552 A1* | 12/2016 | Taylor | G06F 9/5083 718/105 |
| 2017/0019487 A1* | 1/2017 | Maheshwari | H04L 41/22 |
| 2017/0102678 A1* | 4/2017 | Nixon | G05B 19/4185 |
| 2017/0123848 A1* | 5/2017 | Borich | G06F 3/067 |
| 2018/0241649 A1 | 8/2018 | Mazzitelli | |
| 2021/0051080 A1* | 2/2021 | Engel | H04L 41/0843 |

OTHER PUBLICATIONS

Anonymous: "5 User-Defined Metrics", Oracle Enterprise Manager Administration, Jan. 1, 2009 (Jan. 1, 2009), XP055841199, Retrieved from the Internet: URL: https://docs.oracle.com/cd/B162401_01/doc/em.102/e14586/udm.htm#CGDBEFHH (14 pages).

* cited by examiner

| ID | EVENT_NAME | EVENT_DESCRIPTION | EVENT_QUERY | DELETE |
|---|---|---|---|---|
| ID1 | EVENT 1 | DESCRIPTION 1 | METRIC DEFINITION MD1 | DELETE |
| ID2 | EVENT 2 | DESCRIPTION 2 | METRIC DEFINITION MD2 | DELETE |
| ID3 | EVENT 3 | DESCRIPTION 3 | METRIC DEFINITION MD3 | DELETE |
| ID4 | EVENT 4 | DESCRIPTION 4 | METRIC DEFINITION MD4 | DELETE |
| ID5 | EVENT 5 | DESCRIPTION 5 | METRIC DEFINITION MD5 | DELETE |

*FIG. 3*

SYSTEMS AND METHODS FOR MONITORING USER-DEFINED METRICS

TECHNICAL FIELD

Various embodiments of the present disclosure relate generally to systems and methods for monitoring metrics and, more particularly, to systems and methods for automatically scheduling and executing user-defined database queries that generate such metrics and storing query results for access by users.

BACKGROUND

A business or other organization may maintain or have access to data that can be analyzed. A business analyst, for example, may be tasked with performing analytics on such data in order to determine metrics that may be used to understand and improve the performance of a business operation. Data may be analyzed with the use of database queries executed by a computer system. However, the business may include various lines of business (LOBs) or business units that each include their own databases and/or metrics. Therefore, there is a need for systems and methods that facilitate analytics based on database queries. In particular, there is a need for systems and methods for automatically scheduling and executing database queries that generate such metrics, and for enabling multiple users to access the queries and their results.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for monitoring user-defined metrics.

According to one embodiment, a computer-implemented method for monitoring metrics is disclosed. The method may include: receiving, from a user device, a metric definition usable to generate queries to obtain data for a metric to be monitored; receiving, from the user device, a monitoring configuration indicative of a manner in which a metric monitoring process associated with the metric definition is to be repeatedly performed; storing the metric definition in a metric definition database; and repeatedly performing the metric monitoring process in accordance with the monitoring configuration, the metric monitoring process including: retrieving the metric definition from the metric definition database; generating a database query based on the metric definition, the database query including one or more executable database statements defined by the metric definition; executing the database query to obtain query result data, the query result data being data for the metric; and storing the query result data.

In another embodiment, a computer system for monitoring metrics is disclosed. The computer system may include: a memory storing instructions; and one or more processors configured to execute the instructions to perform operations. The operations may include: receiving a plurality of metric definitions, each of the plurality of metric definitions being usable to generate queries to obtain data for a respective metric to be monitored; storing the plurality of metric definitions in a metric definition database; and scheduling and performing a plurality of metric monitoring processes respectively associated with the plurality of metric definitions, such that each of the plurality of metric monitoring processes is periodically performed at a respective user-specified frequency, wherein each of the plurality of metric monitoring processes includes: retrieving the respective metric definition from the metric definition database; generating a database query based on the respective metric definition, the database query including one or more executable database statements defined by the respective metric definition; executing the database query to obtain query result data, the query result data being data for the respective metric; and storing the query result data.

In yet another embodiment, a computer system for monitoring metrics is disclosed. The computer system may include: a memory storing instructions; and one or more processors configured to execute the instructions to perform operations. The operations may include: receiving, from a user device, a metric definition usable to generate queries to obtain data for a metric to be monitored, the metric being a measure or evaluation of events described by data recorded in a data warehouse; receiving, from the user device, a monitoring configuration indicative of a manner in which a metric monitoring process associated with the metric definition is to be repeatedly performed; storing the metric definition in a metric definition database; and repeatedly performing the metric monitoring process in accordance with the monitoring configuration, the metric monitoring process including: retrieving the metric definition from the metric definition database; generating a database query based on the metric definition, the database query including one or more executable database statements defined by the metric definition; executing the database query to obtain query result data, the query result data being data for the metric and being based on the data recorded in the data warehouse; and storing the query result data as part of collected metric data associated with the metric; and executing a web service enabling the user device and other user devices to retrieve the collected metric data.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts an example of a user interface that displays various events for use by the system of FIG. 1.

DETAILED DESCRIPTION OF EMBODIMENTS

Figure 1:
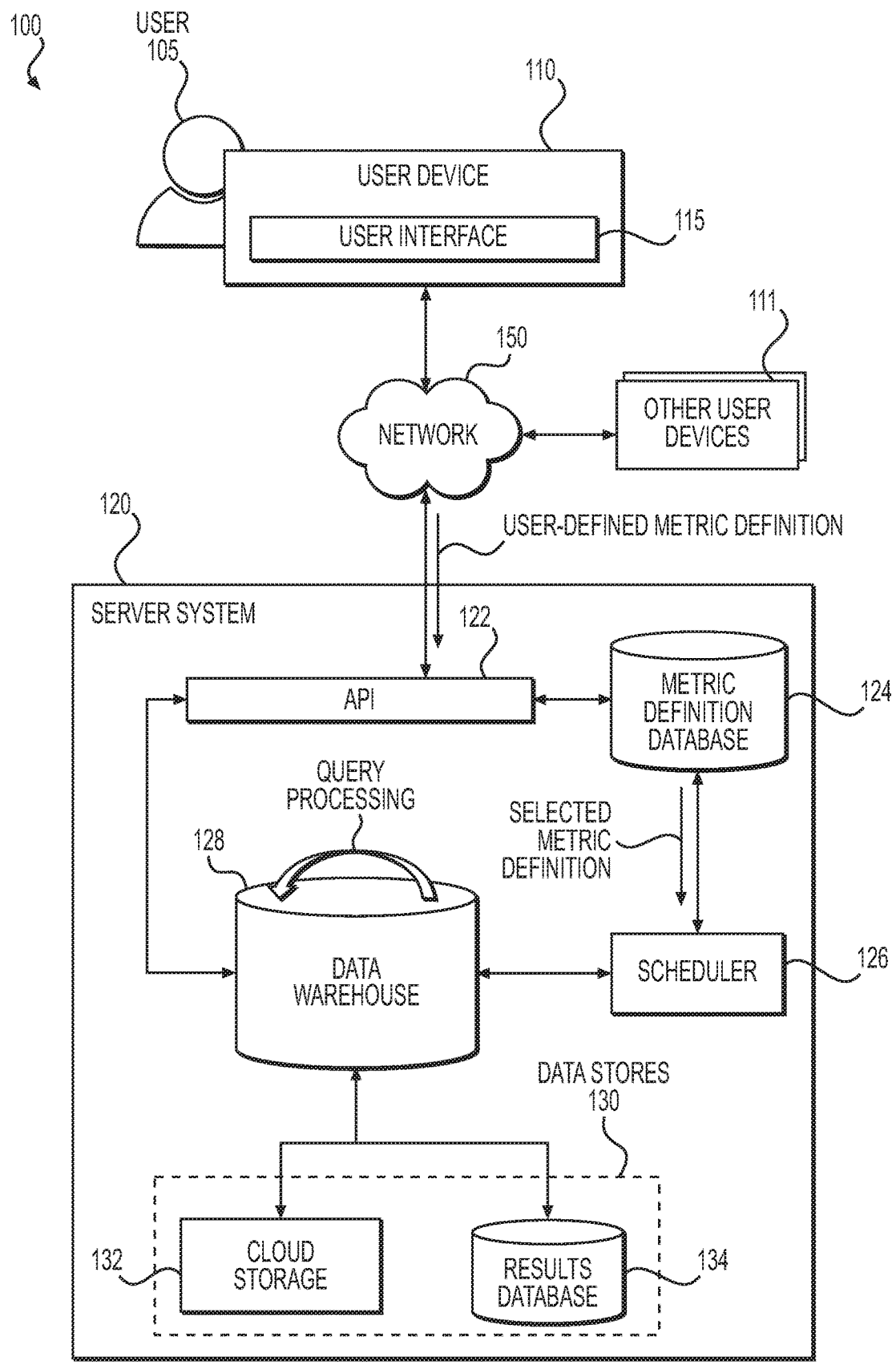
FIG. 1 depicts an exemplary system infrastructure for monitoring user-defined metrics, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, systems and methods for monitoring user-defined metrics are disclosed. Embodiments of the present disclosure may provide for an attribution engine that includes a system for monitoring business metrics designed around flexibility and ease of use by analysts. For example, a user may define a new monitoring metric through structured query language (SQL) commands submitted to the attribution engine. Upon submission, the entire scheduling and reporting pipeline may be automatically set up and users may retrieve historical reports on the defined metrics on-demand.

Embodiments of the present disclosure may also provide for a system architecture for the attribution engine. The system architecture may include three major components, including, for example, configuration, scheduling, and a data warehouse. Users may submit metric definitions (e.g., SQL commands to be run on the data warehouse) to the configuration component. The configuration component may store the definitions and may pass the definitions to the scheduling component. The scheduling component may submit the SQL commands to the data warehouse on a regular basis with user-defined frequencies and may store the results of the commands in the data warehouse itself. Copies of the results may also be routed to a separate database and/or cloud storage for diagnostic purposes.

The configuration component may consist of a REST API layer that receives user-input metric definitions (e.g., as SQL commands). For example, a user may submit the metric definitions to the configuration component via a user interface. The user interface may abstract away any operation beyond the metric definition, and may also expose (e.g., display) previously submitted metric definitions. Thus, users may use previously submitted metric definitions as needed, rather than submit entirely new metric definitions. Submitted metric definitions may be stored in a relational database.

The scheduling component may pick up the SQL queries from the relational database and may send the queries to the data warehouse. In some embodiments, the scheduling component may run on an Apache Airflow platform. The operations within the SQL queries may be processed in the data warehouse and the outcomes may be appended to a table of results within the data warehouse itself. Thus, users may access the results via the table of results displayed on the user interface. Programmatic consumption by applications may also be possible through copies of the results sent to cloud storage and/or a results database.

Referring now to the appended drawings, FIG. 1 illustrates a system 100 for monitoring user-defined metrics. The system 100 may include a user device 110 operated by a user 105, and a server system 120. User device 110 and server system 120 may communicate through communication network 150, which may be one or a combination of public networks (e.g., the Internet), local networks, and/or other networks.

User 105 may be any person or plurality of persons who operate user device 110 to utilize metrics monitoring functionalities provided by server system 120. The role of user 105 may depend on the usage context of system 100. For example, if server system 120 is operated by an organization, such as a company, corporation, or other organization, user 105 may represent an analyst that utilizes server system 120 for monitoring metrics that are relevant to that organization.

In this disclosure, the term "metric" is used broadly and expansively. For example, a "metric" may be a measure or evaluation of some aspect (e.g., activities and/or events) of interest. A metric may be, for example, a performance indicator that measures the performance of, for example, a process, a business operation, or a business or organization as a whole. In some embodiments, a metric may be a business metric that characterizes business-related event(s), such as customer-related activity. For example, a business metric may indicate a quantity, value (e.g., monetary value), and/or statistical characteristic of a certain type of customer activity, such as a number of weekly signups for a new product over a certain period of time. A business metric may also be referred to as a business performance indicator.

A "metric" may be a parameter whose value(s) are determined by data analysis. Such data analysis may be performed using database queries as described in this disclosure. For example, a metric may be a number of new customers per week for a certain line of business, and the values of such metric (e.g., 1500 new customers in week 1, and 1600 new customers in week 2) may be determined by database queries. The values of a metric may be associated with a certain time or time periods (e.g., week 1, week 2, etc.).

User device 110 may be any suitable computer system, such as a laptop or desktop computer or a mobile computing device such as a smartphone, tablet, or wearable computable device. User device 110 may display a user interface (UI) 115 enabling user 105 to access metrics monitoring functionalities provided by server system 120. In some embodiments, user interface 115 may be a graphical user interface of a webpage or web application wherein the webpage or web application may be executed in a web browser application of user device 110. In additional applications, the user interface 115 may be part of a native application executed, or otherwise presented, on user device 110. While a single user 105 and a single user device 110 are shown in FIG. 1, it is understood that system 110 may include a plurality of such user devices, including other user devices 111, each operated by a respective user.

Server system 120 may monitor metrics based on configurations received from user devices, such as user device 110. For example, user 105 may define a new metric and submit the metric to server system 120 through user interface 115. A metric that is defined by the user in a manner usable by server system 120 may be referred to as a "metric definition."

A metric definition may have any suitable form that permits server system 120 to run database queries based on the metric definition. In various embodiments, a metric definition may be a query definition that defines a database query to be executed. This database query may be defined by the query definition such that execution of the database query returns data constituting the metric. A query definition may specify one or more database statements, which may be specified in structured query language (SQL) format.

In some cases, a query definition may include only explicit database statement(s), in which case the query definition may be executed without further modification. For example, the entire query definition may be an SQL query that is executable as-is. However, a query definition may also include interpreted code, such as code that indicates variables to be resolved at the time the database query is executed. Such variables may be used so as to allow the query definition to define a database query that is variable depending on the circumstances of execution, such as the time or date of execution. A query definition may be interchangeably referred to as a query template.

Server system 120 may have automated scheduling and reporting pipeline for handling queries. That is, upon receiving a query definition from user device 110, server system 120 may automatically set up and execute a query in accordance with the query definition. Accordingly, user device 110 and other user devices 111 may retrieve historical reports, which are generated from execution of the defined metrics, on demand.

The functionalities of server system 120 for metrics monitoring may collectively constitute a metrics monitoring engine or an attribution engine. The metrics monitoring engine or attribution engine may include a configuration component, a scheduling component, and a data warehouse component, all of which may be software components executed on server system 120. In general, user 105 may submit, to the configuration component, metric definitions (e.g., such as query definitions) that are to be executed by the data warehouse component. The configuration component may store the metric definitions and pass them to the scheduling component. The scheduling component may then submit query definitions to the data warehouse component on a regular basis with user-defined frequencies and may store the results of the queries executed according to the query definitions in the warehouse itself. Copies of the results may be also routed to a separate database and cloud storage for diagnostic purposes.

Server system 120 may be a computer system of any form that is suitable for performing the functionalities described in this disclosure. For example, server system 120 may have a cloud computing platform with scalable resources for computations and/or data storage, and may run one or more applications on the cloud computing platform to perform the functionalities attributed to server system 120 in this disclosure.

The configuration component may include an application programming interface (API) 122 and metric definitions database 124. API 122 may provide an API layer to which user device 110 may submit metric definitions (e.g., query definitions). Submission of metric definitions may be performed via user interface 115, which may abstract away operations beyond metric definition. User interface 115 may additionally expose previously submitted metric definitions to user 105 so that user 105 may use them, if desired. Metric definitions received from user device 110 may be stored in metric definitions database 124, which may be, for example, a relational database or other suitable data store.

The scheduling component may include scheduler 126. For example, scheduler 126 may an Apache Airflow scheduler that runs on the Apache Airflow platform. Scheduler 126 may retrieve one or more metric definitions from metric definitions database 124 and determine a database query in accordance with the metric definition. In determining a database query in accordance with the metric definition, any variables in the metric definition may be resolved in order to generate the database query. After determining the database query, scheduler 126 may provide the database query to the data warehouse component for query processing.

The data warehouse component may be data warehouse 128. Data warehouse 128 may perform the database query provided by scheduler 126. The results of the query may be stored within data warehouse 128. In some embodiments, the results may be appended to a table of results stored within data warehouse 128. This table of results may constitute metric data associated with the query definition.

User device 110 or other user devices 111 may access the results through the table. Additionally, a copy of the results may be stored in data stores 130, such as in cloud store 132 and/or in results database 134. Other applications running on server system 120, or another computer system, may consume results stored in these data stores 130.

Figure 2:
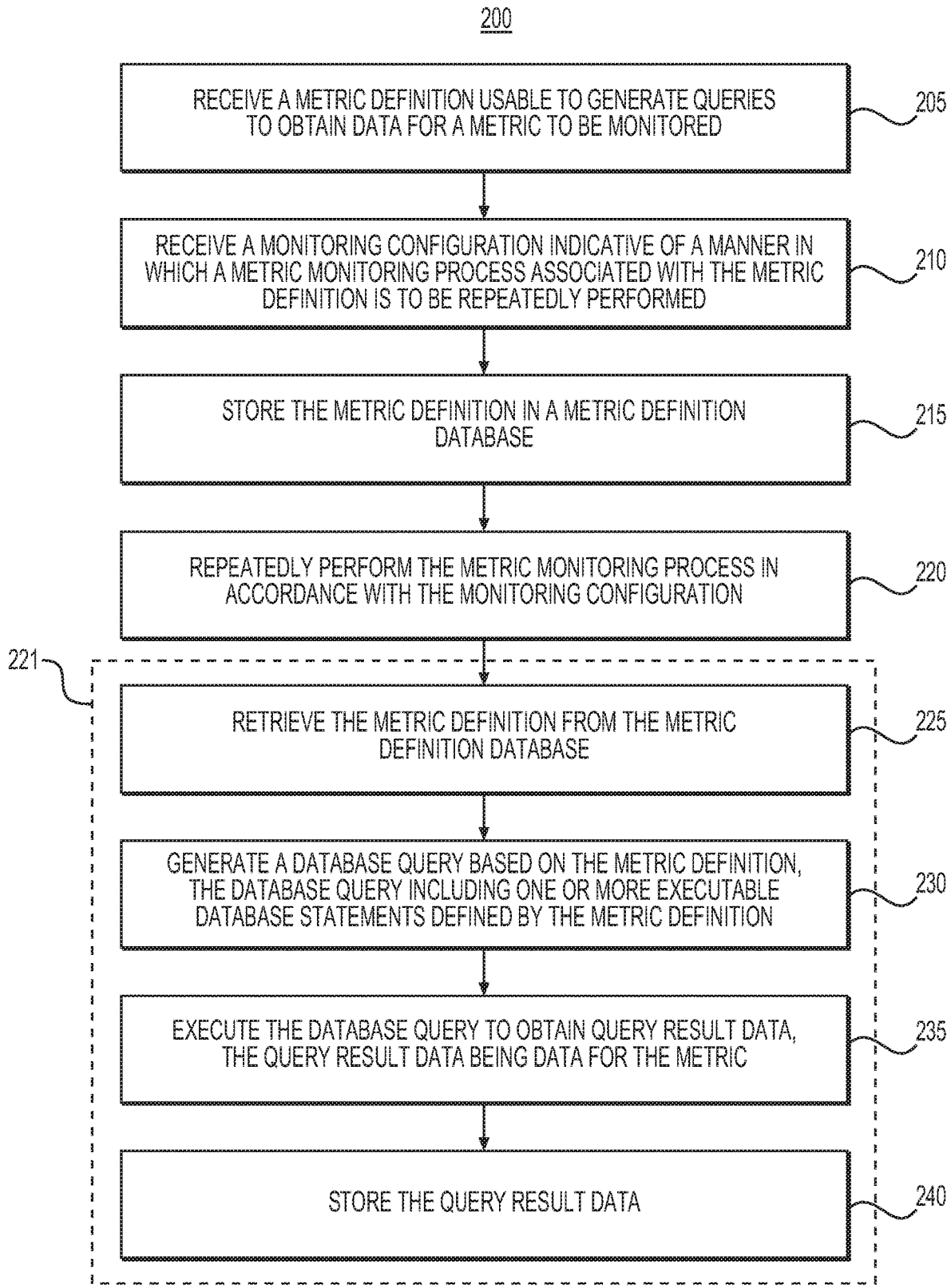
FIG. 2 depicts a flowchart of a method for monitoring user-defined metrics, according to one or more embodiments.

FIG. 2 depicts a flowchart of a method 200 for monitoring user-defined metrics. In an initial step 205, server system 120 may receive a metric definition usable to generate queries to obtain data for a metric to be monitored. For example, server system 120 may receive the metric definition from user device 110. Metric definitions are detailed below with respect to FIG. 3.

In step 210, server system 120 may receive a monitoring configuration indicative of a manner in which a metric monitoring process 221 associated with the metric definition is to be repeatedly performed. The monitoring configuration may specify a frequency of performing the metric monitoring process 221.

In step 215, server system 120 may store the metric definition in metric definition database 124.

In step 220, server system 120 may repeatedly perform the metric monitoring process 221 in accordance with the monitoring configuration.

The metric monitoring process 221 may include steps 225-240 of method 200. For example, in step 225, server system 120 may retrieve the metric definition from the metric definition database 124.

In step 230, server system 120 may generate a database query based on the metric definition, the database query including one or more executable database statements defined by the metric definition.

In step 235, server system 120 may execute the database query to obtain query result data, the query result data being data for the metric. In some embodiments, the metric to be monitored may be a measure or evaluation of events described by data recorded in a data warehouse 128, and the query result data may be based on the data recorded in the data warehouse 128.

In step 240, server system 120 may store the query result data.

The metric monitoring process 221 may be performed periodically at a specified frequency. Further, scheduler 126 may be used to initiate the metric monitoring process 221, detailed above. Scheduler 126 may be configured to initiate additional metric monitoring processes, respectively associated with additional metric definitions stored in the metric definition database 124, in accordance with monitoring configurations associated with the additional metric definitions. Scheduler 126 may be configured to initiate metric monitoring processes 221 respectively associated with different respective metric definitions stored in metric definition database 124 in a sequential manner, so as to avoid concurrent performance of two or more metric monitoring processes 221.

The metric definition may include a template indicative of a variable whose value is to be determined during performance of the metric monitoring process 221. Generating the database query (step 230) may include determining an execution value of the variable. Generating the database query may also include determining the one or more executable database statements by setting the variable to the execution value, such that the one or more executable database segments includes the execution value of the variable.

Storing the query result data may include storing the query result data as part of collected metric data associated with the metric. The collected metric data may include values of the metric for a first period of time and the query result data may include values of the metric for a second period of time. Thus, storing the query result data may include appending the query result data to the collected metric data. Further, the metric monitoring process 221 may be performed a plurality of times such that the collected metric data is updated a plurality of times. The method 200 may further include presenting the collected metric data to the user device 110 or another user device 111.

The method 200 may be performed by a computer system, such as server system 120. The method 200 may further include transmitting a web page including a user interface 115 to the user device 110 to enable a user 105 of the user device 110 to submit the metric definition to the computer system. The method 200 may further include transmitting a web page including a user interface 115 including a list of metric definitions stored in the metric definition database 124 to the user device 110. The list may include one or more metric definitions submitted by another user.

FIG. 3 illustrates an example of a user interface section 300 of user interface 115 that displays various events. As shown in FIG. 3, the exemplary user interface section 300 may include separate columns, or fields, for each event. For example, the fields may include fields for "id," "event name," "event description," event query," and "delete." Accordingly, each event may include an ID, an event name, an event description, an event query, and an option to delete the event. The ID may include a predetermined numerical, alphabetical, and/or alphanumeric value for quickly identifying the event. Each event may include a unique ID assigned to the respective event. The event name may include a plain English language description of what the event is tracking. The event description may provide a more detailed description of the event. The event query may include the metric definition MD1-MD5 of the event. As detailed above, the metric definition may be input by a user 105 on user device 110 and may be stored in metric definition database 124.

The exemplary user interface section 300 includes reference to five different events, including, for example, event 1, event 2, event 3, event 4, and event 5. However, it is understood that user interface section 300 may include any number and/or type of events for monitoring metrics. In one non-limiting example related to financial institutions (e.g., banks), events may include signing up for paperless delivery (e.g., via e-mail), applied for a credit card, approved for a credit card, or balance transfer.

The metric definitions MD1-MD5 for each event may be input by a user 105 and/or may already be stored in metric definition database 124. As detailed above, the metric definition may include a string of code (e.g., in SQL format) that defines a database query to be executed. For example, metric definition MD1 for paperless signup (e.g., event name: "GO_PAPERLESS") may have the form: "CREATE TABLE {{target_schema}}.{{table_name}}_{{start_date.strftimer('%Y_%m_%d')}} AS SELECT DISTINCT b.cust_rgtry_id AS sso=id, TO_TIMESTAMP(a.evt_dt+a.evt_tm, 'YYYY-MMD-DHH24:MI:SS') AS web_actvy_dt, 'GO_PAPERLESS' AS event_name FROM (SELECT DISTINCT acct_id, evt_dt, evt_tm FROM . . . WHERE evt_dt>='{{start_date}}' AND evt_dt<'{{end_date}}' AND evt_type_cd=509 AND scrn_id='KREB') a JOIN . . . b ON . . . " (where an ellipsis ( . . . ) is used to indicate parts of the database query not shown for purposes of illustration).

The metric definition MD1 includes one or more variables to be resolved at the time the database query is executed. The variables may include parameters within the curly brackets or braces (e.g., "{" and "}"). The variables may include different values that are valid in different contexts, such as, for example, different environments, different dates, etc. Thus, the same query may be run in any different context, as defined by the variables. In the exemplary metric definition MD1, the variables may include, for example, target schema, table name, start date, and end date. Thus, the query for metric definition MD1 may be run in different contexts, including different target schema, different table names, and/or different start and end dates.

After the events have been stored in metric definition database 124, any event may be accessed by any user 105 via user device 110 and/or other user devices 111 for any type of campaign. For example, campaigns may include any number of events. Thus, different lines of business (LOBs) may utilize the metric definitions stored in metric definitions database 124 for various events as needed.

Measuring the efficacy of products and business initiatives through analytics is a function useful to a business. However, efficacy can be measured in a wide variety of metrics, some of which are more relevant to the business problem at hand than others. The attribution engine of the present disclosure provides analysts the ability to customize any metric they require, as long as the relevant data is available. In addition, the attribution engine of the present disclosure automatically sets up the entire monitoring process once the analyst has provided the SQL query to define the metric, saving hours or more of manual effort. Analysts can also re-use any metric that has been defined previously, saving them the trouble of creating a query from scratch. The reusability of queries is especially advantageous in the case of commonly used metrics, in that multiple analysts requiring the same metric can access the results of a single calculation instead of expending resources on running the same calculation per analyst. Thus, the systems and methods described above may greatly reduce the workload and turnaround time of monitoring and report generation.

In general, any method discussed in this disclosure that is understood to be computer-implementable, such as the methods described in connection with FIG. 2, may be performed by one or more processors of a computer system, such as user device 110 or server system 120, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as user device 110 and/or server system 120, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 4:
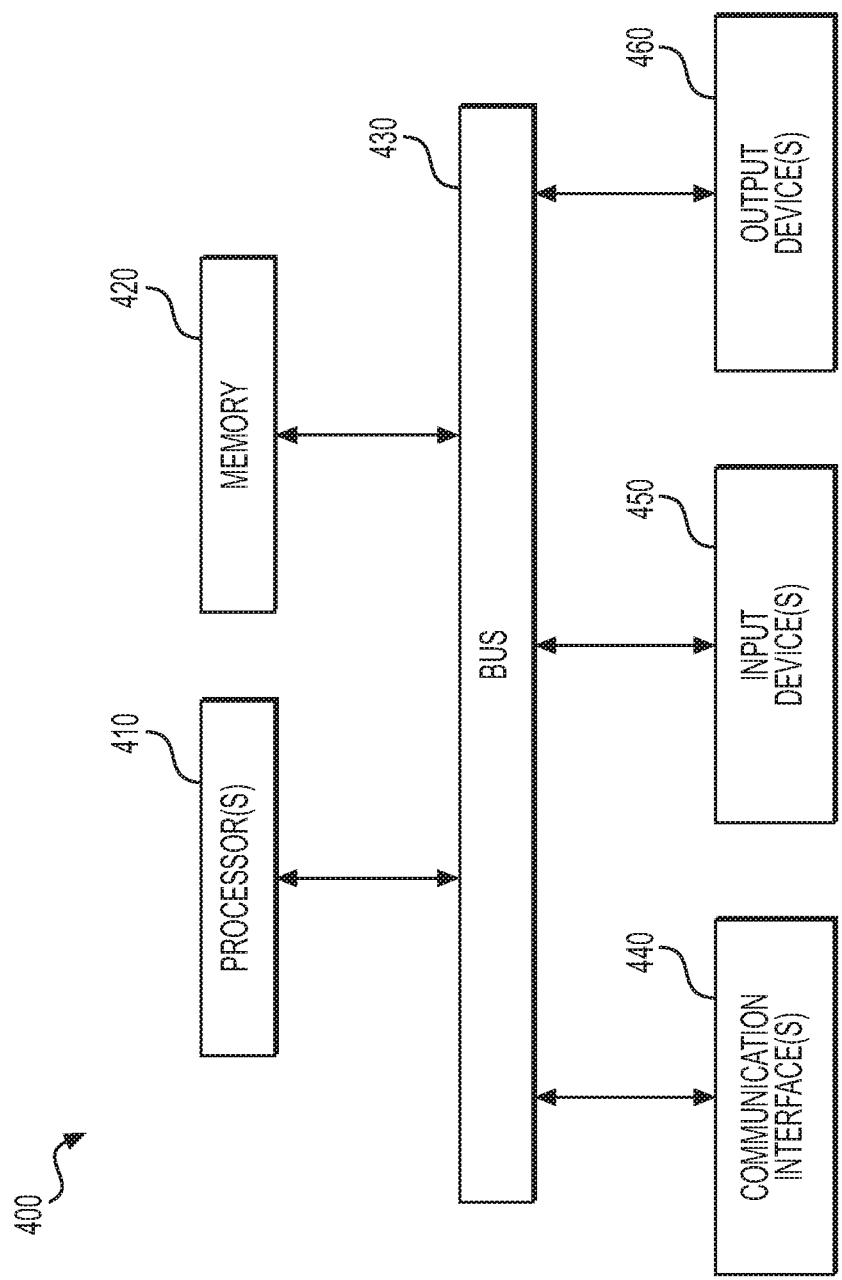
FIG. 4 illustrates an example system that may execute techniques presented herein.

FIG. 4 illustrates an example of a computing device 400 of a computer system. The computing device 400 may include processor(s) 410 (e.g., CPU, GPU, or other processing unit), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for monitoring metrics, the method comprising:
   receiving, by a configuration component, from a user device, a metric definition usable to generate queries to obtain data for a metric to be monitored, the metric definition including code that indicates one or more variables to be resolved at a time of execution of the queries based on a context of the execution;
   receiving, by the configuration component, from the user device, a monitoring configuration indicative of a manner in which a metric monitoring process associated with the metric definition is to be repeatedly performed;
   storing, by the configuration component, the metric definition in a metric definition database; and
   repeatedly performing the metric monitoring process in accordance with the monitoring configuration, the metric monitoring process including:
      retrieving, by a scheduler, the metric definition from the metric definition database based on a user-defined frequency;
      generating, by the scheduler, a database query based on the metric definition, the database query including one or more executable database statements defined by the metric definition, and the generating including resolving the one or more variables based on an execution context of the database query;

sending, by the scheduler, the database query to a data warehouse;

executing, by the data warehouse, the database query to obtain query result data, the query result data being data for the metric; and storing, by the data warehouse, the query result data in the data warehouse, wherein the scheduler is configured to initiate metric monitoring processes respectively associated with different respective metric definitions stored in the metric definition database in a sequential manner such that the scheduler avoids concurrent performance of two or more metric monitoring processes.

2. The method of claim 1, wherein the monitoring configuration specifies a frequency of performing the metric monitoring process, and in the repeatedly performing the metric monitoring process, the metric monitoring process is performed periodically at the specified frequency.

3. The method of claim 2, wherein the scheduler is configured to initiate additional metric monitoring processes, respectively associated with additional metric definitions stored in the metric definition database, in accordance with monitoring configurations associated with the additional metric definitions.

4. The method of claim 1, wherein, to resolve each of the one or more variables, the generating the database query includes:

determining, by the scheduler, an execution value of the variable, and determining, by the scheduler, the one or more executable database statements by setting the variable to the execution value, such that the one or more executable database statements includes the execution value of the variable.

5. The method of claim 1, wherein, in the metric monitoring process, the storing the query result data includes storing the query result data as part of collected metric data associated with the metric.

6. The method of claim 5, wherein in the metric monitoring process, the collected metric data includes values of the metric for a first period of time, the query result data includes values of the metric for a second period of time, and the storing the query result data includes appending the query result data to the collected metric data.

7. The method of claim 5, wherein the metric monitoring process is performed a plurality of times, such that the collected metric data is updated a plurality of times.

8. The method of claim 5, further comprising:

presenting the collected metric data to the user device or another user device.

9. The method of claim 1, wherein the method is performed by a computer system and further comprises:

transmitting, to the user device, a web page including a user interface enabling a user of the user device to submit the metric definition to the computer system.

10. The method of claim 1, further comprising:

transmitting, to the user device, a web page including a user interface including a list of metric definitions stored in the metric definition database.

11. The method of claim 1, wherein the metric to be monitored is a measure or evaluation of events described by data recorded in the data warehouse, and the query result data is based on the data recorded in the data warehouse.

12. A computer system for monitoring metrics, the computer system comprising:

a memory storing instructions; and one or more processors configured to execute the instructions to perform operations including;

receiving, by a configuration component, from one or more user devices, a plurality of metric definitions, each of the plurality of metric definitions being usable to generate queries to obtain data for a respective metric to be monitored, the respective metric being a measure of an event associated with a particular period of time;

storing, by the configuration component, the plurality of metric definitions in a metric definition database; and scheduling and performing a plurality of metric monitoring processes respectively associated with the plurality of metric definitions, such that each of the plurality of metric monitoring processes is periodically performed at a respective user-specified frequency, wherein each of the plurality of metric monitoring processes includes:

retrieving, by a scheduler, the respective metric definition from the metric definition database;

generating, by the scheduler, a database query based on the respective metric definition, the database query including one or more executable database statements defined by the respective metric definition;

sending, by the scheduler, the database query to a data warehouse;

executing, by the data warehouse, the database query to obtain query result data, the query result data being data for the respective metric; and storing, by the data warehouse, the query result data as part of collected metric data associated with the respective metric in a table of the data warehouse that is accessible by a plurality of user devices including the one or more user devices, the query result data including values of the respective metric for a first period of time corresponding to the particular period of time, wherein, as the respective metric monitoring process is repeatedly performed for each of the plurality of metric monitoring processes, additional query result data obtained is appended to the collected metric data in the table of the data warehouse, the additional query result data including values of the respective metric for a second period of time corresponding to the particular period of time, and wherein the scheduler is configured to initiate the plurality of metric monitoring processes in a sequential manner such that the scheduler avoids concurrent performance of two or more metric monitoring processes.

13. The computer system of claim 12, wherein the plurality of metric definitions and the plurality of metric monitoring processes respectively include a first metric definition and a first metric monitoring process associated with the first metric definition, the first metric definition including a query template indicative of a variable whose value is to be determined during performance of the first metric monitoring process, and for the first metric monitoring process, the generating the database query includes:

determining, by the scheduler, an execution value of the variable, and determining, by the scheduler, one or more executable database statements by setting the variable to the execution value, such that the one or more executable database statements includes the execution value of the variable.

14. The computer system of claim 12, wherein a first metric definition of the plurality of metric definitions is received from a user device, and the operations further include transmitting, to the user device, a web page including a user interface enabling a user of the user device to submit the first metric definition to the computer system.

15. The computer system of claim 14, wherein the operations further include:

transmitting, to the user device, a web page including a user interface including a list of the plurality of metric definitions stored in the metric definition database, the list including one or more metric definitions submitted by another user.

16. A computer system for monitoring metrics, the computer system comprising:

a memory storing instructions; and one or more processors configured to execute the instructions to perform operations including;

receiving, by a configuration component, from a user device, a metric definition usable to generate queries to obtain data for a metric to be monitored, the metric definition including code that indicates one or more variables to be resolved at a time of execution of the queries based on a context of the execution, and the metric being a measure or evaluation of events associated with a particular period of time that are described by data recorded in a data warehouse;

receiving, by the configuration component, from the user device, a monitoring configuration indicative of a manner in which a metric monitoring process associated with the metric definition is to be repeatedly performed;

storing, by the configuration component, the metric definition in a metric definition database; and repeatedly performing the metric monitoring process in accordance with the monitoring configuration, the metric monitoring process including:

retrieving, by a scheduler, the metric definition from the metric definition database based on a user-defined frequency;

generating, by the scheduler, a database query based on the metric definition, the database query including one or more executable database statements defined by the metric definition, and the generating including resolving the one or more variables based on an execution context of the database query;

sending, by the scheduler, the database query to a data warehouse;

executing, by the data warehouse, the database query to obtain query result data, the query result data being data for the metric and being based on the data recorded in the data warehouse; and storing, by the data warehouse, the query result data as part of collected metric data associated with the metric in a table of the data warehouse that is accessible by a plurality of user devices including the user device, the query result data including values of the metric for a first period of time corresponding to the particular period of time, wherein, as the metric monitoring process is repeatedly performed, additional query result data obtained is appended to the collected metric data in the table of the data warehouse, the additional query result data including values of the metric for a second period of time corresponding to the particular period of time; and executing a web service enabling the plurality of user devices to retrieve the collected metric data such that, in response to receiving a request from one of the plurality of user devices for the values of the metric for one or more of the first period of time or the second period of time, the requested values are retrieved from the table of the data warehouse and provided to the one of the plurality of user devices for display rather than causing the database query to be re-executed, wherein the scheduler is configured to initiate metric monitoring processes respectively associated with different respective metric definitions stored in the metric definition database in a sequential manner such that the scheduler avoids concurrent performance of two or more metric monitoring processes.

17. The computer system of claim 12, wherein the event of which the metric is a measure of is described by data recorded in the data warehouse, and the query result data is based on the data recorded in the data warehouse.

18. The computer system of claim 12, wherein, in response to receiving a request from one of the plurality of user devices for the values of the respective metric for one or more of the first period of time or the second period of time, retrieving the requested values from the table of the data warehouse to provide to the one of the plurality of user devices for display rather than causing the database query to be re-executed.

19. The method of claim 4, wherein the execution value of the variable is determined by the scheduler based on an execution context of the database query, the execution context including one or more of a date, a time, or an environment associated with the execution.

20. The computer system of claim 16, wherein, to resolve each of the one or more variables, the generating the database query includes:

determining, by the scheduler, an execution value of the variable based on the execution context of the database query, the context including one or more of a date, a time, or an environment associated with the execution; and determining, by the scheduler, the one or more executable database statements by setting the variable to the execution value, such that the one or more executable database statements includes the execution value of the variable.

* * * * *